March 6, 1945. D. H. CLARK 2,370,777
ROTARY CULTIVATOR UNIT
Original Filed April 10, 1942
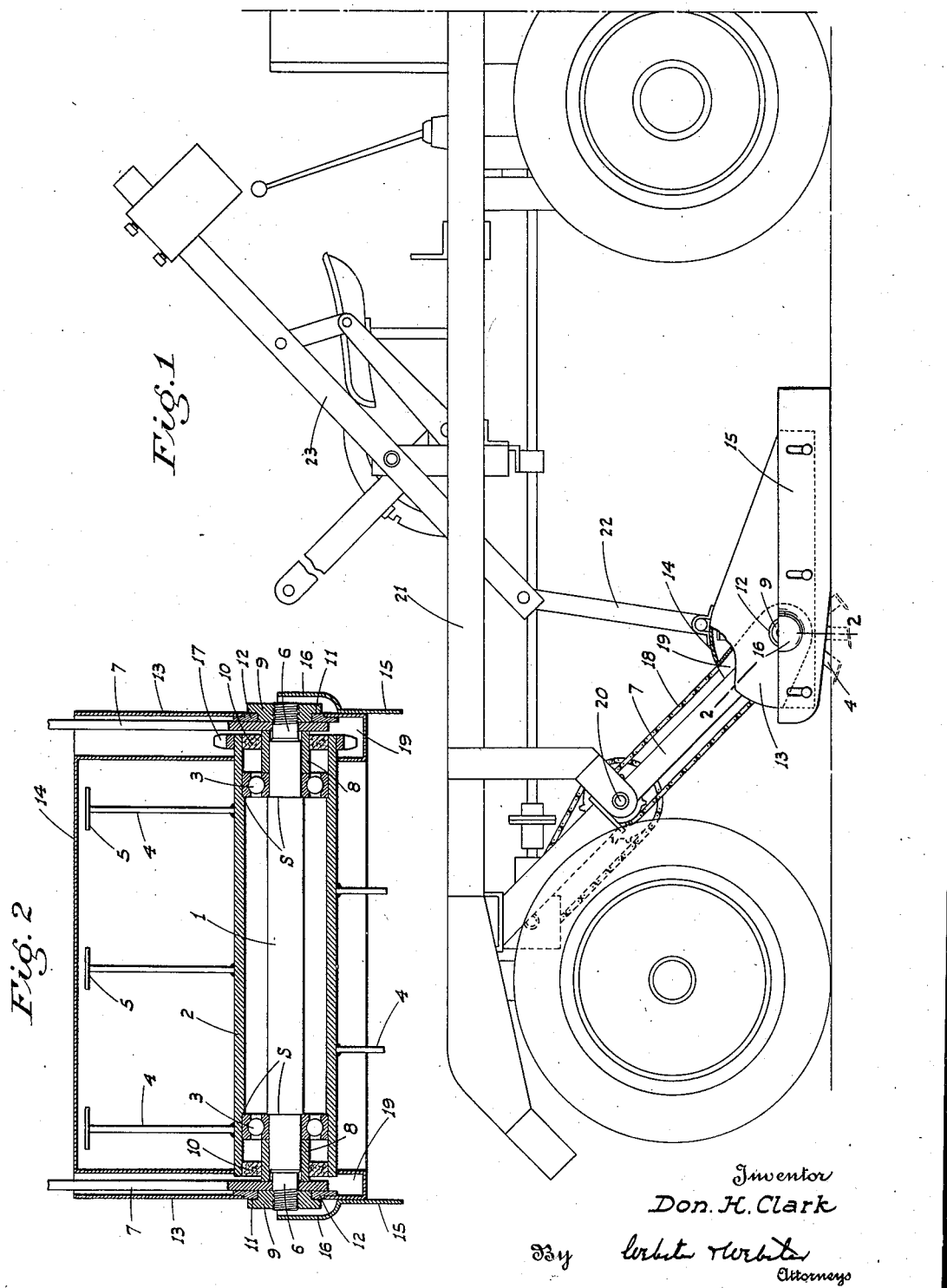
Inventor
Don. H. Clark
By [signature]
Attorneys Patented Mar. 6, 1945

2,370,777

UNITED STATES PATENT OFFICE 2,370,777

ROTARY CULTIVATOR UNIT

Donald H. Clark, Sacramento, Calif.

Original application April 10, 1942, Serial No. 438,369. Divided and this application January 13, 1943, Serial No. 472,222

5 Claims. (Cl. 97—215)

This invention relates to rotary cultivators, and is particularly a division of my co-pending application for patent, Serial No. 438,369, filed April 10, 1942.

Any such rotary cultivator will naturally throw considerable dirt into the surrounding air and if such dirt is light and dry and is not properly confined, it tends to cover the adjacent portion of the machine and has a detrimental abrasive action on the working parts, besides making very poor working conditions for the operator, both as respects his comfort and visibility if the wind is blowing.

An important object of the invention therefore is to provide a hood for each unit so mounted as to completely enclose the dirt thrown about by the rotary cultivating elements, and so that it may rotate axially of the cultivating elements and relative thereto, in such manner as to confine all of the dirt regardless of ground conditions. This feature also enables the straight lower edge of the hood to remain parallel to the ground irrespective of the vertical adjustment of the cultivator unit relative to the ground.

The rotary cultivator includes an axial shaft supported by radial tension arms and a sleeve turnable on the shaft, the cultivator teeth or other ground engaging elements being mounted on the sleeve.

A further object is to provide means for clamping the shaft and arms together, which also serve as supports for the hood on which the latter is turnable, so that a simple compact and sturdy assembly is provided.

Another object is to provide a unit so arranged that the bearings between the shaft and rotary sleeve are completely enclosed and protected both against abrasive wear from dust and the like and from possible damage by exterior objects.

These objects I accomplish by means of such structure and relative arrangement of parts as will fully appear by a perusal of the following specification and claims.

In the drawing similar characters of reference indicate corresponding parts in the several views:

Figure 1 is a side elevation of my improved cultivator unit as mounted on a supporting vehicle.

Figure 2 is an enlarged transverse section of the unit on the line 2—2 of Fig. 1.

Referring now more particularly to the characters of reference on the drawing, the cultivator unit includes a central axial shaft 1, a sleeve 2 turnable on ball or similar bearings 3 on the shaft some distance back from the ends of the sleeve, and ground working elements of suitable character, here shown as including shanks 4 rigid with and projecting from the sleeve and having transverse ground engaging blades 5 on their outer end. The shaft and sleeve are shouldered as at S beyond the bearings to locate the latter against inward movement toward each other.

The shaft 1 projects beyond the ends of the sleeve and at each end is formed with a reduced threaded portion 6. Tension arms 7 engage the reduced shaft portions 6 intermediate their ends; each arm being clamped rigid with the shaft (which does not need to turn) by a spacer 8 on the shaft between the inner race of adjacent bearing 3 and the arm, and a nut 9 threaded on the shaft portion 6 and engaging the outer face of the arm. In order to protect the bearings and confine any lubricant within sleeve 2, sealing rings 10 are disposed between the spacers 8 and the inner face of the sleeve adjacent the ends of the latter, as shown.

The nut 9 is shaped with a circular portion of reduced size projecting toward the arm, and forming a circumferential groove 11 with the adjacent face of the arm, in which groove a disc 12 is turnable; said disc being supported on the circular portion of the nut.

The side plates 13 of a cultivator enclosing hood 14 are fixed on the discs 12, the plates and hood as a whole projecting some distance rearwardly from the rotating unit and terminating a sufficient distance above the bottom of the latter to enable the blades 5 to project the necessary working distance below ground level. Vertically movable side extension plates or skirts 15 are mounted on the side plates 13 and substantially ride on the ground, the lower edge of said extension plates at the front sloping upwardly slightly as shown so as to avoid any abrupt corners. In order to allow the skirts to overlap the nuts 9 in protection relation while enabling said skirts to move up and down, they are formed with pockets 16 surrounding the nuts in clearance relation. A sprocket wheel 17 is secured on the sleeve at one end just inwardly of the adjacent arm 7 for engagement with a drive chain 18.

The portion of the chain and arms 7 within the hood are enclosed by surrounding shields 19, one wall of which is formed by the adjacent side plate 13 of the hood; the end walls of the shields or wells flaring toward their outer end to allow of the necessary relative swivel movement of the hood and arms about the shaft as an axis. It will thus be seen that each rotary cultivator unit is completely enclosed, while the adjacent portion of the corresponding chain drive is protected from contact with dirt thrown about by the cultivating elements. It will also be seen that the hood is free to turn relative to the cultivator unit, while forming a means for engagement with a control and lifting device, whereby the entire unit may be raised or lowered.

In the present instance the arms 7 extend upwardly at a forward slope to and are turnable about a transverse shaft 20 supported from the frame 21 of a self-propelled vehicle, the chain drive 18 extending to and being driven from said shaft. Raising and lowering of the rotary cultivator unit is controlled by a link 22 pivotally connected to the top of the hood and depending from a counter-weighted lever mechanism 23 preferably of the same type as shown in the aforesaid mentioned copending application.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention, what I claim as new and useful and desire to secure by Letters Patent is:

1. In a rotary cultivator, an axial shaft, a pull arm extending from each end of the shaft, a sleeve turnable on the shaft between the arms and having cultivating elements mounted thereon, a hood enclosing the upper portion of the cultivator and including side plates, means mounting the side plates for rotation about the shaft as an axis, one plate being disposed laterally out from one arm, a sprocket on the sleeve adjacent said arm, a chain about said sprocket having spaced runs extending lengthwise of said arm, the top of the hood having an opening through which said arm and the chain runs project, and a shield about the portion of the chain and arm within the hood and secured on and formed in part with the hood.

2. In a rotary cultivator, an axial shaft, a pull arm extending from each end of the shaft, a sleeve turnable on the shaft between the arms and having cultivating elements mounted thereon, a hood enclosing the upper portion of the cultivator and including side plates, the side plates having circular openings larger than the shaft and members mounted on the shaft and covering the openings and having circular portions projecting laterally inward and through the openings in supporting and relatively turnable relation.

3. In a rotary cultivator unit an axial shaft, a sleeve turnable on the shaft and having cultivator elements mounted thereon, arms engaging the shaft outwardly of the sleeve, a pair of anti-friction bearings between the sleeve and shaft inwardly of the arms, each bearing comprising a shaft-engaging inner race and a sleeve-engaging outer race, means holding the inner races of the bearings against movement axially of the shaft and sleeve in a direction toward each other, spacers between the inner races of the bearings and the arms, and elements mounted on the shaft outwardly of the arms and clamping the latter against the spacers.

4. In a rotary cultivator, an axial shaft, pull arms extending from the shaft adjacent its ends, a sleeve turnable on the shaft between the arms and having cultivating elements thereon, a hood enclosing the upper portion of the cultivator, members mounted on the shaft laterally out from the sleeve and including circular portions concentric with the shaft and side plates on the hood having orifices concentric with the shaft through which the circular portions of said members project in close fitting and relative turnable relation.

5. In a rotary cultivator, an axial shaft, arms extending from the shaft adjacent its ends, a sleeve turnable on the shaft between the arms and having cultivating elements thereon, a hood enclosing the upper portion of the cultivator, and including side plates laterally out from the arms, arm retaining members mounted on the shaft laterally out from the arms and having reduced circular portions concentric with the shaft on the side of said members facing the arms and forming with the adjacent faces of the arms, circular grooves concentric with the shaft; the side plates projecting into the grooves and having orificed elements fitting said reduced circular portions in relatively turnable relation.

DONALD H. CLARK.